(12) United States Patent
Rhe et al.

(10) Patent No.: US 11,275,459 B2
(45) Date of Patent: Mar. 15, 2022

(54) TOUCH DISPLAY DEVICE AND TOUCH DISPLAY PANEL HAVING A CURVED ACTIVE AREA AND IMPROVING A TOUCH SENSITIVITY AT A CURVED PORTION

(71) Applicant: LG Display Co., Ltd., Seoul (KR)

(72) Inventors: Ruda Rhe, Paju-si (KR); KwangJo Hwang, Paju-si (KR); JiHyun Jung, Paju-si (KR); DeukSu Lee, Paju-si (KR); SuChang An, Paju-si (KR); JaeGyun Lee, Paju-si (KR); Yangsik Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/660,356

(22) Filed: Oct. 22, 2019

(65) Prior Publication Data
US 2020/0050311 A1 Feb. 13, 2020

Related U.S. Application Data

(63) Continuation of application No. 15/807,280, filed on Nov. 8, 2017, now Pat. No. 10,488,966.

(30) Foreign Application Priority Data

Jun. 1, 2017 (KR) .......................... 10-2017-0068250

(51) Int. Cl.
*G06F 3/041* (2006.01)
*G06F 3/044* (2006.01)
(Continued)

(52) U.S. Cl.
CPC ............ *G06F 3/0412* (2013.01); *G06F 3/047* (2013.01); *G06F 3/0446* (2019.05);
(Continued)

(58) Field of Classification Search
CPC ...... G06F 3/0412; G06F 3/047; G06F 3/0416; G06F 3/044; G06F 3/0448; G06F 3/0443; G06F 3/041; G02F 1/13338; H01B 7/04
See application file for complete search history.

(56) References Cited

U.S. PATENT DOCUMENTS 9,523,735 B2    12/2016   Zeise et al.
10,761,664 B2    9/2020   Kwon et al.
(Continued)

FOREIGN PATENT DOCUMENTS

CN    101907964 A    12/2010
CN    103186277 A    7/2013
(Continued)

*Primary Examiner* — Adam J Snyder
(74) *Attorney, Agent, or Firm* — Seed IP Law Group LLP (57) ABSTRACT

The present embodiments generally relate to a display panel and a display device which may recognize touch. A display panel is provided in which a touch sensor and a touch line are disposed in an active area in which a part of an outer edge of the touch line is curved to correspond to a curved shape of the active area in the display panel so that the touch sensing is allowed in display panels having various shapes. Further, a touch display device is provided in which an open area is located between two adjacent touch lines disposed on the display panel so that touch sensing is allowed also in the display panel including an open area such as a hole or a notch.

16 Claims, 8 Drawing Sheets

(51) Int. Cl.
*G06F 3/047* (2006.01)
*G02F 1/1333* (2006.01)
*H01B 7/04* (2006.01)

(52) U.S. Cl.
CPC ...... *G06F 3/04164* (2019.05); *G02F 1/13338* (2013.01); *G06F 3/041* (2013.01); *G06F 3/044* (2013.01); *G06F 3/0443* (2019.05); *G06F 3/0448* (2019.05); *G06F 2203/04112* (2013.01); *H01B 7/04* (2013.01)

(56) References Cited

U.S. PATENT DOCUMENTS

| | | |
|---|---|---|
| 2010/0110041 A1 | 5/2010 | Jang |
| 2010/0328254 A1 | 12/2010 | Niga et al. |
| 2011/0007020 A1 | 1/2011 | Hong et al. |
| 2011/0068999 A1 | 3/2011 | Street |
| 2011/0216838 A1 | 9/2011 | Lin et al. |
| 2013/0015865 A1 | 1/2013 | Izumi |
| 2014/0152580 A1 | 6/2014 | Weaver et al. |
| 2015/0062456 A1 | 3/2015 | Miyazaki et al. |
| 2015/0153876 A1 | 6/2015 | Chien et al. |
| 2015/0185942 A1* | 7/2015 | Kim ............... G06F 3/0445 345/173 |
| 2015/0251393 A1 | 9/2015 | Kanna et al. |
| 2016/0077645 A1* | 3/2016 | Chien ............... G06F 3/0446 349/12 |
| 2016/0170537 A1 | 6/2016 | Chen et al. |
| 2016/0202826 A1 | 7/2016 | Han et al. |
| 2016/0216838 A1* | 7/2016 | Aina ............... G06F 3/0418 |
| 2016/0378224 A1* | 12/2016 | Kwon ............... G06F 3/044 345/174 |
| 2017/0185224 A1* | 6/2017 | Nagata ............... G06F 3/0446 |
| 2017/0235398 A1* | 8/2017 | Choi ............... H04M 1/0266 345/173 |
| 2017/0242545 A1 | 8/2017 | Kimura et al. |
| 2017/0285844 A1 | 10/2017 | Park et al. |
| 2017/0287992 A1* | 10/2017 | Kwak ............... G06F 1/1626 |
| 2017/0293380 A1* | 10/2017 | Chauveau ............... G06F 3/04164 |
| 2017/0307924 A1 | 10/2017 | Liu et al. |
| 2018/0074609 A1* | 3/2018 | Jeon ............... G06F 3/041 |
| 2018/0120988 A1* | 5/2018 | Kim ............... G06F 3/0412 |
| 2018/0150166 A1* | 5/2018 | Aoki ............... G06F 3/0446 |
| 2018/0226454 A1 | 8/2018 | Liu et al. |
| 2018/0292698 A1* | 10/2018 | Koide ............... G06F 3/0446 |
| 2018/0321539 A1* | 11/2018 | Koide ............... G06F 3/0445 |

FOREIGN PATENT DOCUMENTS

| | | |
|---|---|---|
| CN | 104317469 A | 1/2015 |
| CN | 106373981 A | 2/2017 |
| CN | 106462280 A | 2/2017 |
| CN | 106775173 A | 5/2017 |
| EP | 2 157 500 A2 | 2/2010 |
| EP | 2 955 611 A1 | 12/2015 |
| GB | 2499388 A | 8/2013 |
| JP | 3198981 U | 7/2015 |
| JP | 2016-42358 A | 3/2016 |
| JP | 2017-16655 A | 1/2017 |
| KR | 10-2015-0001016 A | 1/2015 |
| TW | 201601020 A | 1/2016 |
| TW | 201612713 A | 4/2016 |
| WO | 2014/141893 A1 | 9/2014 |
| WO | 2014/181774 A1 | 11/2014 |
| WO | 2015/182473 A1 | 12/2015 |
| WO | 2017/045340 A1 | 3/2017 |

* cited by examiner

TOUCH DISPLAY DEVICE AND TOUCH DISPLAY PANEL HAVING A CURVED ACTIVE AREA AND IMPROVING A TOUCH SENSITIVITY AT A CURVED PORTION

CROSS-REFERENCE TO RELATED APPLICATIONS

This application is a continuation of U.S. application Ser. No. 15/807,280, filed Nov. 8, 2017, which claims priority from Korean Patent Application No. 10-2017-0068250, filed Jun. 1, 2017, which applications are hereby incorporated by reference for all purposes as if fully set forth herein.

BACKGROUND

Technical Field

The present disclosure relates to touch display panels and a touch display devices which may sense user's touch on a display panel. More particularly, the present disclosure relates to touch display panels and touch display devices having one or more curved portions or open areas.

Description of the Related Art

With the progress of the information-oriented society, various types of demands for display devices which display an image are increasing. Further, various types of display devices such as a liquid crystal display device, a plasma display device, and an organic light emitting display device have been used.

Such a display device provides a function of recognizing user's touch on a display panel and performing an input processing based on the recognized touch in order to provide various functions to the user.

For example, a plurality of touch sensors are disposed on a display panel to sense the user's touch on the display panel, and touch lines are provided which connect the touch sensors to a driving circuit. Further, a change in a capacitance caused by the user's touch on the display panel is sensed to detect the presence or absence of the user's touch on the display panel and a touched position.

Therefore, in such a touch display device, a touch sensor and a touch line need to be disposed in the display panel. However, it is difficult to apply a layout structure of the touch sensor and the touch line of the related art to various shaped display devices emerging according to various demands of users in recent years.

BRIEF SUMMARY

In one aspect, the present embodiments provide a layout structure of the touch sensors and the touch lines which is capable of recognizing user's touch on a display panel in display devices having various shapes, including non-quadrangular shapes.

In another aspect, the present embodiments provide a touch display device and a touch display panel which constantly maintain a sensitivity of touch sensing according to a position of a display panel in various display devices and enables touch sensing on the display panel.

According to an embodiment of the present disclosure, there is provided a touch display device including a display panel having an active area in which a plurality of pixels are disposed, and a non-active area outside of the active area. The active area has an outer perimeter including a curved portion. A plurality of touch sensors are positioned on the active area, and a plurality of touch lines are disposed on the non-active area. The plurality of touch lines are connected to the plurality of touch sensors, and have respective curved portions corresponding to the curved portion of the outer perimeter of the active area.

According to another embodiment of the present disclosure, there is provided a touch display panel including an active area having an outer perimeter including a curve, and a non-active area positioned outside the active area and having an outer perimeter including a curve. A plurality of touch sensors are positioned on the active area, and a plurality of touch lines are positioned on the non-active area. The plurality of touch lines are connected to the plurality of touch sensors, and have respective curved portions positioned between the curved outer perimeter of the active area and the curved outer perimeter of the non-active area.

According to still another embodiment of the present disclosure, there is provided a touch display device including a display panel having an active area and an open area formed at least partially in the active area. A plurality of touch lines are disposed on the display panel, and a plurality of touch lines are disposed on the display panel and connected to the plurality of touch sensors. The open area is positioned between two adjacent touch lines of the plurality of touch lines.

According to one or more embodiments, a touch sensor and a touch line are disposed to correspond to shapes of a display panel and an active area in various display devices so that a user's touch on the display panel may be sensed in display devices having various shapes.

Further, a size of the touch sensor may be adjusted according to a position of the display panel so that a sensitivity of the touch sensing according to the position of the display panel in the various shapes of display devices may be uniformly maintained.

Further, a method for implementing variant display device while maintaining the layout structure of the touch sensor and the touch line is provided.

BRIEF DESCRIPTION OF THE SEVERAL VIEWS OF DRAWINGS

The above and other aspects, features and other advantages of the present disclosure will be more clearly understood from the following detailed description taken in conjunction with the accompanying drawings, in which.

DETAILED DESCRIPTION

Hereinafter, some embodiments of the present disclosure will be described in detail with reference to the accompanying drawings. When designating elements of the drawings by reference numerals, the same elements may be referenced by the same reference numerals, although the same elements are illustrated in different drawings. Further, if it is considered that a detailed description of related known features, configurations or functions may cloud or otherwise obscure the gist of the present disclosure, then the detailed description of such known features, configurations or features may be omitted.

Further, in describing components of the present disclosure, terminologies such as first, second, A, B, (a), (b), and the like may be used. The terminologies are used to distinguish one component from another component. However, a nature, an order, a sequence, or the number of components is not limited by the terminologies. If it is described that a component is "connected" or "coupled" to another component, it is understood that the component may be directly connected or coupled to the other component, one or more additional components may be interposed between the components, or the components may be "connected" or "coupled" through another component.

Figure 1:
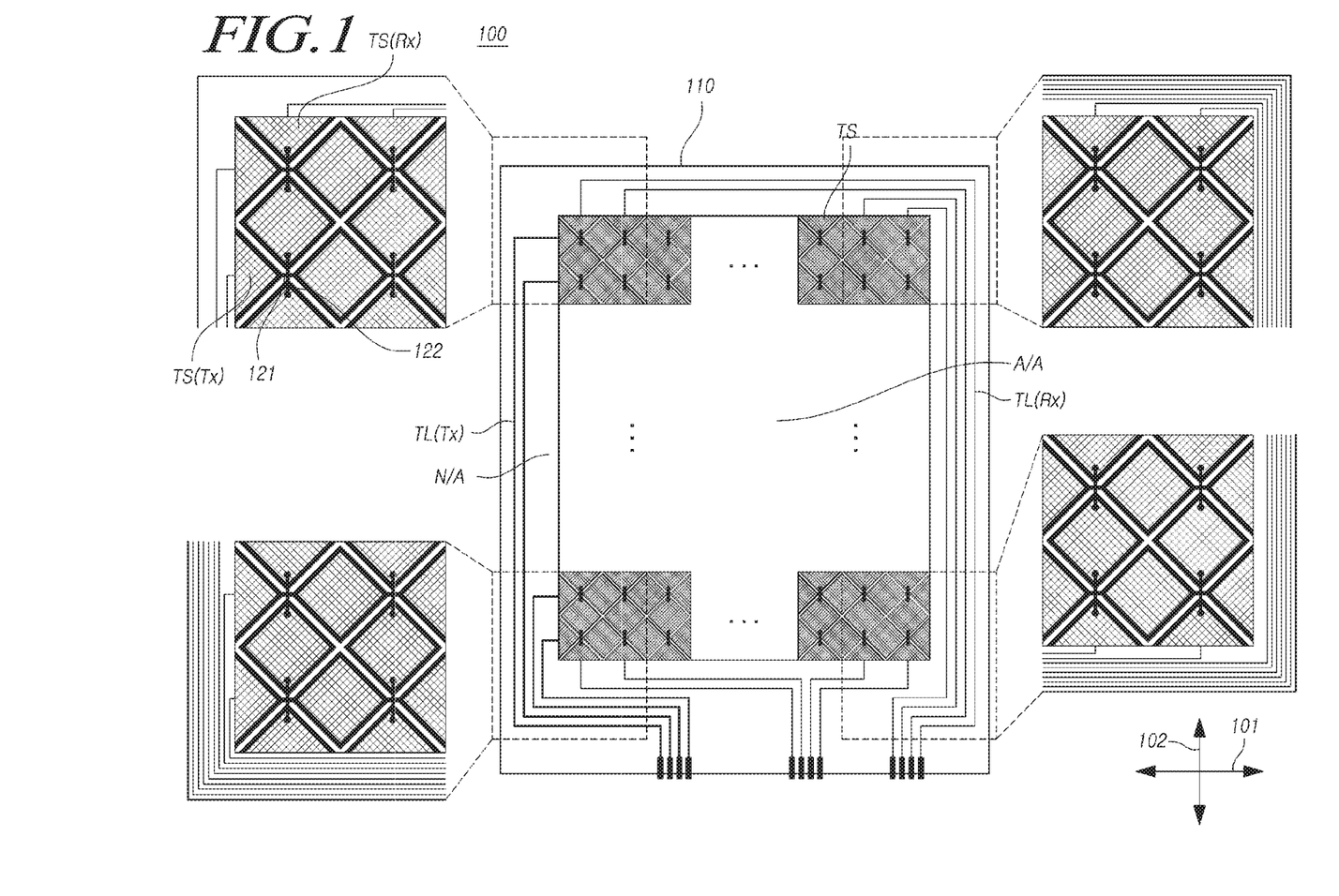
FIG. 1 is a plan view schematically illustrating a touch display device according to one or more embodiments of the present disclosure.

FIG. 1 is a plan view schematically illustrating a touch display device 100 according to one or more embodiments of the present disclosure.

Referring to FIG. 1, a touch display device 100 according to embodiments of the present disclosure includes a touch display panel 110 on which a plurality of touch sensors TS and a plurality of touch lines TL are disposed, and a driving circuit (not illustrated) which outputs a touch driving signal to the touch sensors TS and senses touch based on a touch sensing signal received from the touch sensors TS.

The plurality of touch sensors TS may include first touch sensors TS(Tx) and second touch sensors TS(Rx). Similarly, the plurality of touch lines TL may include first touch lines TL(Tx) and second touch lines TL(Rx). The first touch sensors TS(Tx) are coupled to one another along a first direction 101 by first electrical connections 121 so as to form rows of first touch sensors TS(Tx). Each row of the first touch sensors TS(Tx) is coupled to a respective first touch line TL(Tx), which supplies a touch driving signal from the driving circuit to the first touch sensors TS(Tx).

The second touch sensors TS(Rx) are coupled to one another along a second direction 102 by second electrical connections 122 so as to form columns of second touch sensors TS(Rx). Each column of the second touch sensors TS(Rx) is coupled to a respective second touch line TL(Rx), which supplies the touch sensing signal from the second touch sensors TS(Rx) to the driving circuit. The first direction 101 may be a horizontal direction, as shown in the plan view of FIG. 1, and the second direction 102 may be a vertical direction in the plan view of FIG. 1. Further, the first direction 101 and the second direction 102 may be perpendicular to one another, as shown. However, embodiments provided herein are not limited thereto.

The touch display panel 110 may be divided into an active area A/A in which a plurality of sub pixels are disposed to display an image, and a non-active area N/A which is located outside the active area A/A and includes a wiring line which transmits a signal applied to the sub pixels.

In the active area A/A of the touch display panel 110, gate lines and data lines are disposed to intersect each other and sub pixels are disposed in areas where the gate lines and the data lines intersect.

The sub pixels disposed in the active area A/A represent a gray scale according to a data voltage supplied through a respective data line in accordance with a timing of a scan signal applied to the respective gate line to display an image through the active area A/A.

In such an active area A/A, a plurality of touch sensors TS for sensing user's touch may be disposed in addition to a configuration for display driving. That is, touch sensors TS for sensing touch and a plurality of sub pixels for displaying images may be disposed in the active area A/A.

In a plurality of touch sensors TS, when the touch display device 100 is a liquid crystal display device, a common electrode which is disposed in the active area A/A may be utilized as the touch sensors TS. When the touch display device 100 is an organic light emitting display device, the touch sensors TS may be disposed on an encapsulation layer, but the present exemplary embodiments are not limited thereto. Accordingly, in various embodiments, the touch sensors TS may be variously configured, and the touch display device 100 may include any type of display device, including a liquid crystal display device and an organic light emitting display device.

Figure 2:
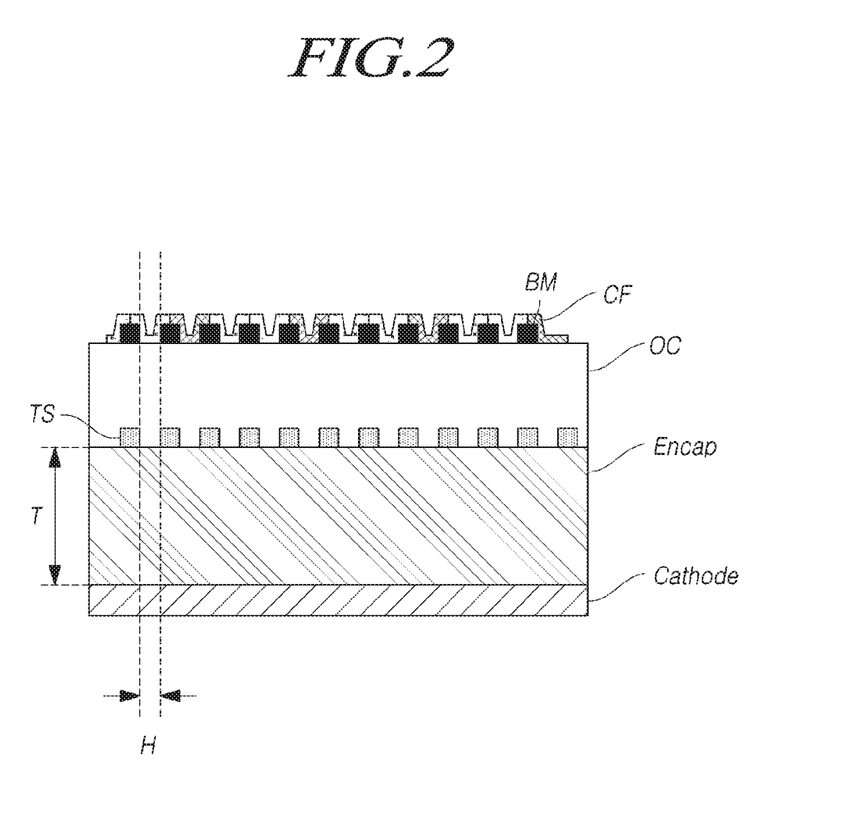
FIGS. 2 and 3 are cross-sectional views illustrating positions of the touch sensor in a touch display device when the touch display device is an organic light emitting display device, in accordance with one or more embodiments of the present disclosure.

Here, when the touch display device 100 is an organic light emitting display device, a structure in which the touch sensor TS is disposed will be briefly described with reference to FIGS. 2 and 3. In one or more embodiments, as shown in FIG. 2, the touch sensors TS may be disposed between an encapsulation layer Encap and a cover of the touch display panel 110.

That is, a configuration for touch sensing such as a plurality of touch sensors TS and touch lines TL (not shown) may be disposed on the encapsulation layer Encap.

Specifically, a cathode of an organic light emitting diode OLED is disposed below the encapsulation layer Encap and the touch sensors TS are disposed on the encapsulation layer Encap to be spaced apart from the cathode.

For example, a thickness T of the encapsulation layer Encap may be 5 μm or larger.

The thickness T of the encapsulation layer Encap may be designed to be equal to or larger than a predetermined thickness so that a parasitic capacitance formed between the cathode of the organic light emitting diode OLED and the touch sensors TS may be reduced to a suitable level. Accordingly, the lowering of touch sensing sensitivity due to the parasitic capacitance may be suppressed.

In one or more embodiments, the touch sensor TS may be a mesh type touch sensor including a hole H, and the hole H included in the touch sensor TS may be located to correspond to a light emitting unit of the sub pixel. The holes H are spaces between adjacent portions of the touch sensor TS, and the holes H may be aligned with light emitting portions of respective sub pixels, such that light emitting from the sub pixels may pass through the holes H, between adjacent portions of the touch sensor TS, and out of the display device to display an image.

Therefore, the hole H of the touch sensor TS may correspond to a color filter CF. For example, when a white organic light emitting diode OLED is used so that a color filter CF is required, a touch display device 100 having excellent light emission performance may be provided by associating a position of the color filter CF with the position of the hole H of the touch sensor TS. That is, the color filters CF may be aligned with the holes H so that light emitted from a respective sub pixel may pass through a respective hole H and through a respective color filter CF. The color filters CF may have various colors and may correspond, for example, to red, green and blue sub pixels.

A vertical position of the touch sensor TS and the color filter CF may be designed in various forms.

For example, as illustrated in FIG. 2, the color filter CF and a black matrix BM may be disposed on the touch sensor TS. Further, the color filter CF and the black matrix BM may be disposed on an overcoat layer OC disposed on the touch sensor TS. The black matrix BM may correspond with non-emissive regions of the sub pixels, and may be aligned with the touch sensors TS, as shown.

Figure 3:
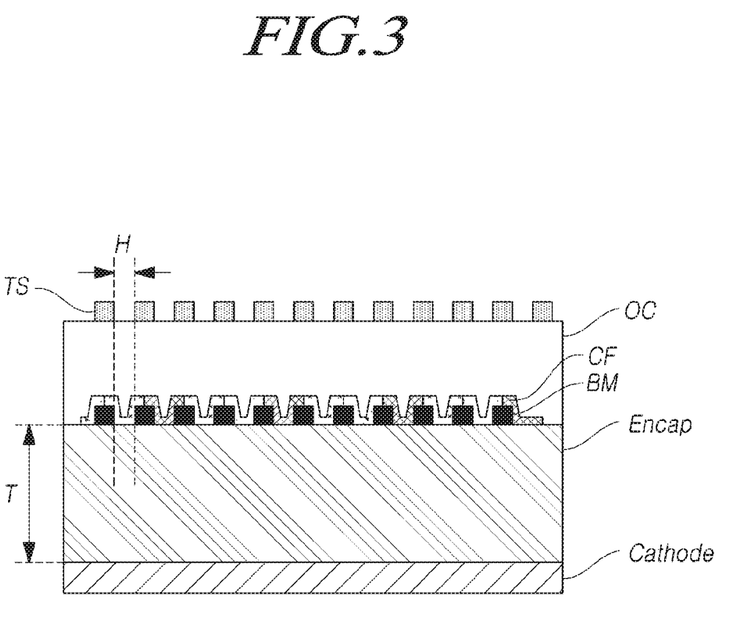

As another example, as illustrated in FIG. 3, the color filter CF and the black matrix BM may be disposed below the touch sensor TS. In this case, the touch sensor TS may be disposed on the overcoat layer OC, which may be disposed on the color filter CF and the black matrix BM. The color filter CF and black matrix BM may be provided on the encapsulation layer Encap, as shown in FIG. 3.

That is, the touch sensor TS and the color filter CF may be designed to have a suitable position relationship in consideration of a touch performance and a display performance.

Further, a structure in which the touch sensor TS is disposed on the encapsulation layer Encap is provided so that it is possible to overcome a problem in that it is difficult to form a touch sensor TS which is generally a metal material in the panel due to the presence of an organic material and to provide an organic light emitting display device having excellent display performance and touch performance.

Each of the plurality of touch sensors TS disposed in the touch display panel 110 may be disposed to have a structure in which the plurality of touch sensors TS are uniformly separated, or spaced apart from one another by a uniform gap, in the active area A/A and are connected to the driving circuit through the touch lines TL.

The touch sensor TS and the touch line TL may be disposed to have various structures in accordance with a touch sensing method. In the present disclosure, an example that the touch is sensed by a mutual capacitive sensing manner will be described, but the present embodiments are not limited thereto.

Referring again to FIG. 1, the plurality of touch sensors TS may include a plurality of first touch sensors TS(Tx), which may be referred to herein as Tx electrodes. The first touch sensors TS(Tx) receive a touch driving signal output from the driving circuit. The touch sensors TS may further include second touch sensors TS(Rx), which may be referred to herein as Rx electrodes, which transmit a touch sensing signal to the driving circuit.

Further, the plurality of touch lines TL may include a plurality of first touch lines TL(Tx) connected to the Tx electrodes of the touch sensors TS and a plurality of second touch lines TL(Rx) connected to the Rx electrodes.

For example, as illustrated in FIG. 1, the first touch lines TL(Tx) are connected to respective Tx electrodes of the touch sensor TS in a first direction 101, e.g., a horizontal direction as shown in FIG. 1, and the second touch lines TL(Rx) may be connected to respective Rx electrodes of the touch sensor TS in a second direction 102, e.g., a vertical direction as shown in FIG. 1.

The driving circuit applies a touch driving signal to the Tx electrodes through the first touch lines TL(Tx) during a time period when the touch is sensed, i.e., a touch sensing period. The driving circuit receives the touch sensing signal from the Rx electrodes through the second touch lines TL(Rx) to determine presence or absence of the user's touch and a touched position on the touch display panel 110.

Here, when the touch display panel 110 is quadrangular, as shown in FIG. 1, the touch lines TL disposed in the non-active area N/A of a right-angled portion of the touch display panel 110 may be disposed to have a structure curved at a right angle. That is, the touch lines TL may include right angle bends corresponding to the right angle shape of the corner regions of the touch display panel 110.

However, in the case of display devices having various shapes, including non-quadrangular shapes, which have emerged in recent years, there is a problem in that the touch sensors TS disposed in the active area A/A or the touch lines TL disposed in the non-active area N/A are not disposed with the same structure.

Further, in such various touch display devices 100, the sensitivity of the touch sensing according to a position of the touch display panel 110 may not be uniform. Additionally, when the touch display panel 110 includes an open area, it is difficult to design the touch sensors TS and the touch lines TL.

The present disclosure provides various embodiments of touch display devices, and methods for implementing a touch sensor TS and a touch line TL in various types of touch display devices, and also provides a method for constantly maintaining a sensitivity of touch sensing even when the touch display device has various shapes.

Figure 4:
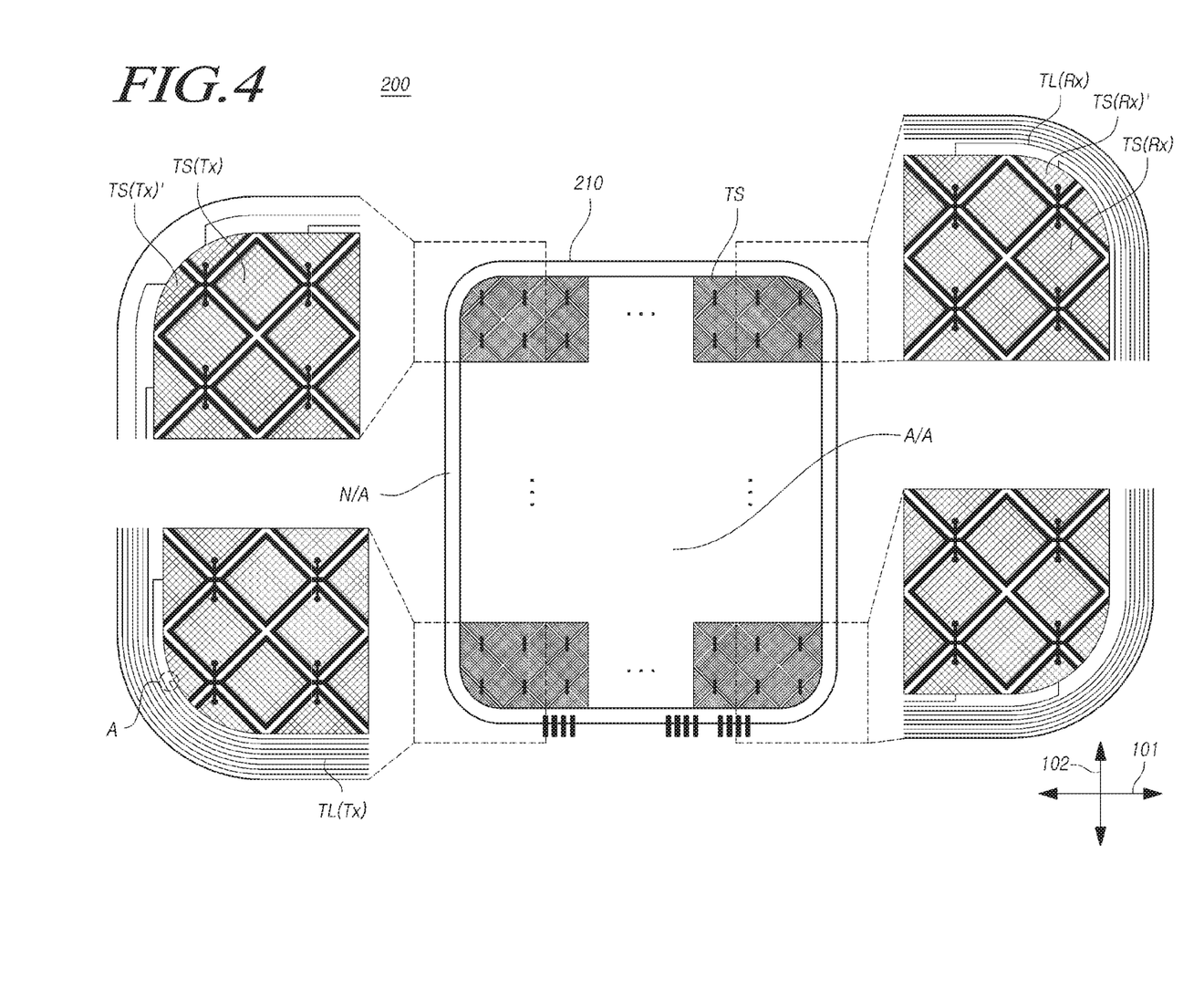
FIG. 4 is a plan view schematically illustrating a structure of a touch sensor and a touch line in a touch display device having one or more curved outer edges, in accordance with one or more embodiments of the present disclosure.

FIG. 4 illustrates a touch display device 200, in which the touch sensors TS and the touch lines TL are disposed, according to one or more embodiments of the present disclosure. In this case, an outer edge of the touch display panel 210 includes a curve. More particularly, an outer perimeter of the touch display panel 210 includes first opposite sides that extend in the first direction, e.g., the top and bottom sides as shown in FIG. 4. Second opposing sides extend in the second direction 102, e.g., the left and right sides as shown in FIG. 4. Curved corner portions of the outer perimeter extend between the respective first and second sides.

Referring to FIG. 4, the touch display device 200 according to one or more embodiment includes a touch display panel 210 on which a plurality of touch sensors TS and a plurality of touch lines TL are disposed and a driving circuit (not illustrated) which drives the touch sensors TS.

The touch display panel 210 may be divided into an active area A/A in which a sub pixel for displaying an image and a plurality of touch sensors TS for touch sensing are disposed, and a non-active area N/A located outside the active area A/A.

An outer edge of the touch display panel 210 includes straight line portions and curved line portions. For example, a curved outer edge may be formed in a portion where an outer edge which is a straight line in the first direction 101, e.g., a horizontal direction as shown, and an outer edge which is a straight line in the second direction 102, e.g., a vertical direction, intersect in the touch display panel 210.

The active area A/A of the touch display panel 210 is disposed inside the touch display panel 210 and a part of the outer edge of the active area A/A may include a curved line.

That is, the outer edge of the active area A/A may include straight line portions and curved line portions corresponding to the shape of the outer edge of the touch display panel 210. A portion of the active area A/A having a curved outer edge may be disposed in position corresponding to a portion of the touch display panel 210 having a curved outer edge.

A plurality of touch sensors TS are disposed in the active area A/A and the plurality of touch sensors TS disposed in the active area A/A may be disposed according to the shape of the active area A/A.

For example, the touch sensor TS disposed inside the active area A/A are disposed to have a uniform shape and the touch sensors TS disposed at the boundary of the active area A/A may be disposed to have different shapes according to the shape of the outer edge of the active area A/A. That is, the touch sensors TS include first touch sensors TS(Tx) and second touch sensors TS(Rx) which have a uniform shape, which may be the same, for example, as the first and second touch sensors TS(Tx), TS(Rx) as shown in FIG. 1. Further, the touch sensors TS may include first boundary touch sensors TS(Tx)' and second boundary touch sensors TS(RX)' that are positioned along the perimeter of the active area A/A, and have shapes that correspond to or define the outer perimeter of the active area A/A.

Accordingly, in the first and second boundary touch sensors TS(Tx)', TS(Rx)', which are disposed to be in contact with a portion of the active area A/A having a curved outer edge, a part of the outer edge may be a curved line and may have various sizes in accordance with the position where the touch sensor TS is disposed.

Since the touch sensors TS are disposed according to the shape of the active area A/A, the user's touch on the touch display panel 210 in the touch display device 200 implemented as various display devices may be sensed.

The touch sensors TS are connected to the driving circuit through the plurality of touch lines TL.

The touch lines TL disposed on the touch display panel 210 are disposed in the non-active area N/A to be connected to the touch sensors TS disposed in the active area A/A.

When the touch display panel 210 senses the touch in a mutual capacitive sensing manner, the plurality of touch lines TL may be configured by first touch lines TL(Tx) connected to the Tx electrodes of the touch sensor TS and second touch lines TL(Rx) connected to the Rx electrodes of the touch sensor TS. The first touch lines TL(Tx) and the second touch lines TL(Rx) are shown in FIG. 4 only in the enlarged views of the corner regions of the touch display panel 210, where the first and second touch lines TL(Tx), TL(Rx) have a different shape than as shown in FIG. 1. In the other regions of the touch display panel 210 of FIG. 4, the first and second touch lines TL(Tx), TL(Rx) have substantially the same shape as shown in FIG. 1, and thus the first and second touch lines TL(Tx), TL(Rx) are not shown in these regions for convenience.

For example, the first touch lines TL(Tx) of the touch line TL may be disposed along one side, e.g., a left side as shown, of the non-active area N/A of the touch display panel 210 and are connected to the first touch sensors TS(Tx) or the first boundary touch sensors TS(Tx)' disposed in the active area A/A in the first direction 101, e.g., a horizontal direction as shown.

The second touch lines TL(Rx) may be disposed along one or both sides, e.g., left or right sides as shown, and may be connected along the second direction 102 to the second touch sensors TS(Rx) or the second boundary touch sensors TS(Rx)' disposed in the active area A/A in the second direction 102. The second touch lines TL(Rx) may extend from a lower non-active area N/A of the touch display panel 210 to the upper non-active area N/A of the touch display panel 210 along a left or right non-active area N/A of the touch display panel 210 where the first touch lines TL(Tx) are not disposed. For example, as shown in FIG. 4, the first touch lines TL(Tx) extend along the left side of the non-active area N/A of the touch display panel 210, while the second touch lines TL(Rx) extend along the right side of the non-active area N/A.

Here, the first touch lines TL(Tx) or the second touch lines TL(Rx) may be disposed to be curved in the non-active area N/A located outside of a portion of the active area A/A having a curved outer edge, e.g., the corner regions.

That is, the touch lines TL are disposed to be curved in the non-active area N/A located between a portion of the active area A/A having a curved outer edge and a portion of the touch display panel 210 having a curved outer edge to be disposed corresponding to the shape of the outer edge of the active area A/A.

Therefore, the touch lines TL disposed on the non-active area N/A of the touch display panel 210 are disposed as a straight line or a curved line according to the shape of the outer edge of the active area A/A.

Therefore, even when the touch display device 100 is designed to be variant types, e.g., having a non-quadrangular shape, the touch lines TL that connect the touch sensors TS and the driving circuit may be easily implemented.

As a part of the touch lines TL are disposed to be a curved line, when the curved portion in the touch lines TL are connected to the touch sensors TS disposed in the active area A/A, the touch lines TL may have a structure curved to form an acute angle or an obtuse angle. This shown, for example, at region "A" of FIG. 4, where the curved touch line TL(Tx) bends from a curved portion to extend in the first direction 101 to connect to a corresponding first touch sensor TS(Tx), thereby forming an acute angle.

In contrast, when the touch line TL is disposed only to have a straight line, a portion where the touch line TL is connected to the touch sensor TS is formed to be curved at a right angle. However, the touch line TL may include a curve portion and may be connected to the touch sensor TS in the curve portion so that at least a part of the touch line TL may be formed to have a structure curved to form an acute angle or an obtuse angle.

As described above, according to the present embodiments, the touch sensor TS and the touch line TL disposed in the touch display panel 210 are implemented according to the shape of the active area A/A so that user's touch may be sensed also in the variant touch display device 200.

In this case, the touch sensors TS are disposed to have different shapes according to the shape of the active area A/A, which may result in a reduction of the sensitivity of the touch sensing depending on the position of the sensed touch on the touch display panel 210.

The touch display device 200 according to one or more embodiments provides a structure of the touch sensors TS and the touch lines TL which may be implemented in the various shapes of touch display devices and further provides a method for constantly maintaining the sensitivity of the touch sensing.

Figure 5:
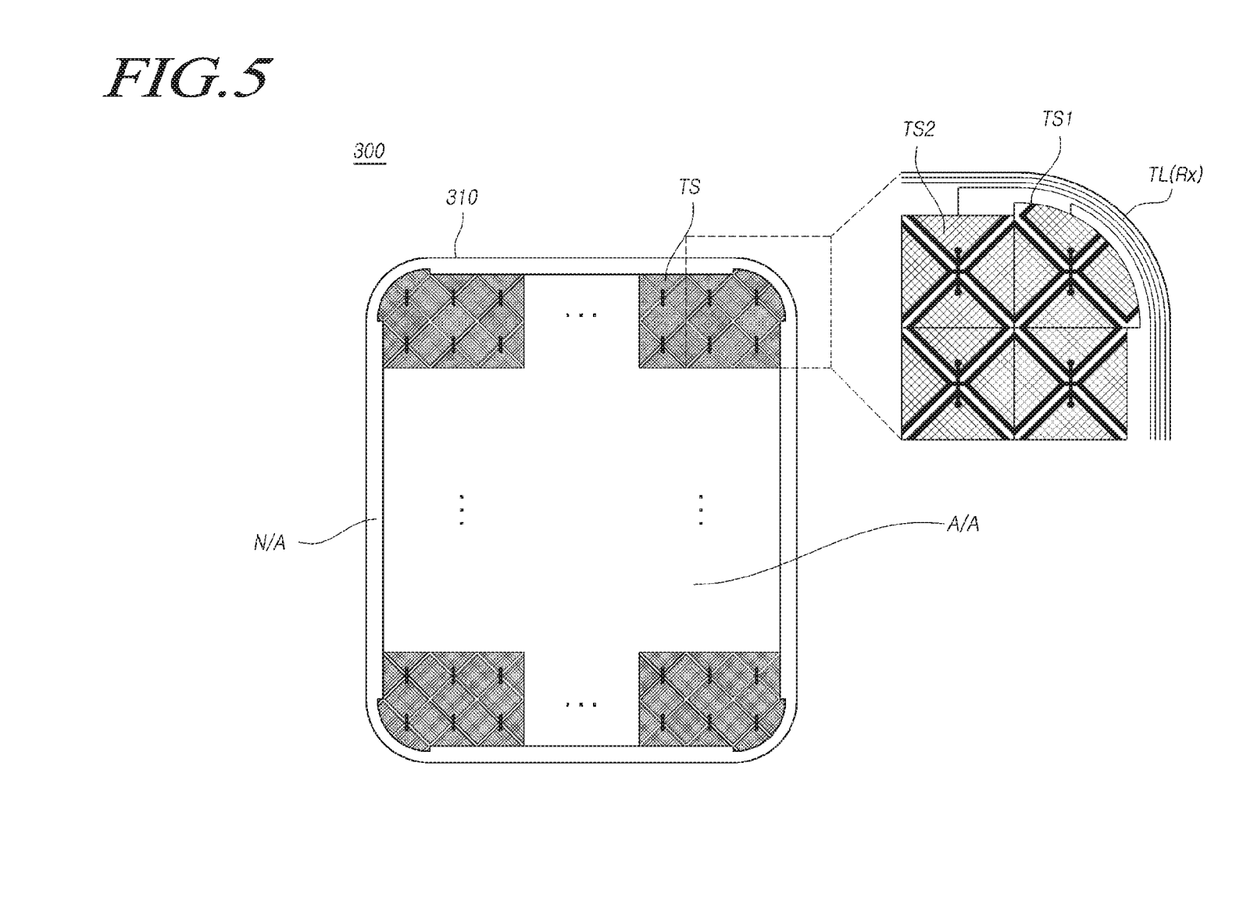
FIG. 5 is a plan view schematically illustrating another example of a structure of a touch display device having one or more curved outer edges, in accordance with one or more embodiments of the present disclosure.

FIG. 5 illustrates another example of a structure of a touch sensor TS disposed at the boundary of the active area A/A in a touch display device 300 according to one or more embodiments of the present disclosure.

Referring to FIG. 5, the touch display device 300 includes a touch display panel 310 on which a plurality of touch sensors TS and a plurality of touch lines TL are disposed and a driving circuit (not illustrated) which drives the touch sensors TS.

An active area A/A in which a part of an outer edge is a curved line is disposed inside the touch display panel 310 and a non-active area N/A is disposed outside the active area A/A.

In the active area A/A, a plurality of sub pixels for displaying an image and a plurality of touch sensors TS for sensing the touch are disposed.

The plurality of touch sensors TS are separately disposed in the active area A/A and are disposed according to the shape of the active area A/A.

For example, touch sensors TS disposed inside the active area A/A among the plurality of touch sensors TS have a predetermined shape and are disposed to be separated from each other. The touch sensors TS disposed at the boundary of the active area A/A may be disposed to have different shapes according to an outer edge of the active area A/A.

Therefore, in the touch sensors TS disposed in a portion of the active area A/A having a curved outer edge, a part of the edge of the touch sensors TS may have a curved line.

In this case, the touch sensors TS disposed in a portion of the active area A/A having a curved outer edge is disposed to have a shape according to the shape of the active area A/A so that a size of the touch sensor TS at the curved boundary of the active area A/A may be smaller than a size of an adjacent touch sensor TS.

By doing this, a sensitivity of the touch sensing of the touch sensor TS disposed in a portion of the active area A/A having a curved outer edge may be lower than a sensitivity of the touch sensing of the touch sensor TS disposed in a portion of the active area A/A having a straight line outer edge.

Therefore, in order to constantly maintain the sensitivity of the touch sensing in the outer edge of the active area A/A, in the touch display device 300 according to one or more embodiments, the touch sensors TS disposed in a portion of the active area A/A having a curved outer edge may be disposed to protrude toward the outside of the active area A/A.

For example, referring to FIG. 5, the touch sensors TS disposed at the outer edge of the active area A/A may include a first touch sensor TS1 disposed in a portion of the active area A/A having a curved outer edge and a second touch sensor TS2 disposed in a portion of the active area A/A having a straight line outer edge. Both the first and second touch sensors TS1, TS2 are shown and discussed herein as Rx electrodes; however, in various embodiments, the first touch sensors TS1 that are positioned at the curved outer edge of the active area A/A and that protrude outside the active area A/A may include one or more Tx electrodes, and one or more Rx electrodes.

Here, the first touch sensor TS1 has a shape according to the curved outer edge of the active area A/A so that the size of the first touch sensor TS1 is smaller than the size of the second touch sensor TS2 having the straight line edge at the boundary of the active area A/A.

Therefore, the first touch sensor TS1 which is in contact with the curved outer edge of the active area A/A is disposed to protrude toward the outside of the active area A/A, beyond the second touch sensor TS2 which is in contact with the straight line outer edge of the active area A/A.

Since the first touch sensor TS1 is disposed to protrude toward the outside of the active area A/A beyond the second touch sensor TS2, a size difference of the first touch sensor TS1 and the second touch sensor TS2 may be reduced. That is, the first touch sensor TS1 may be increased in size to protrude beyond the perimeter of the active area A/A, thereby reducing a size difference between the first touch sensor TS1 and the second touch sensor TS2 that would otherwise exist if the first touch sensor TS1 extends only to the boundary of the active area A/A.

By doing this, it is possible to suppress the lowering of the sensitivity of the touch sensing according to the position at the boundary of the active area A/A, in the structure in which the touch sensor TS is disposed according to the shape of the active area A/A.

Figure 6:
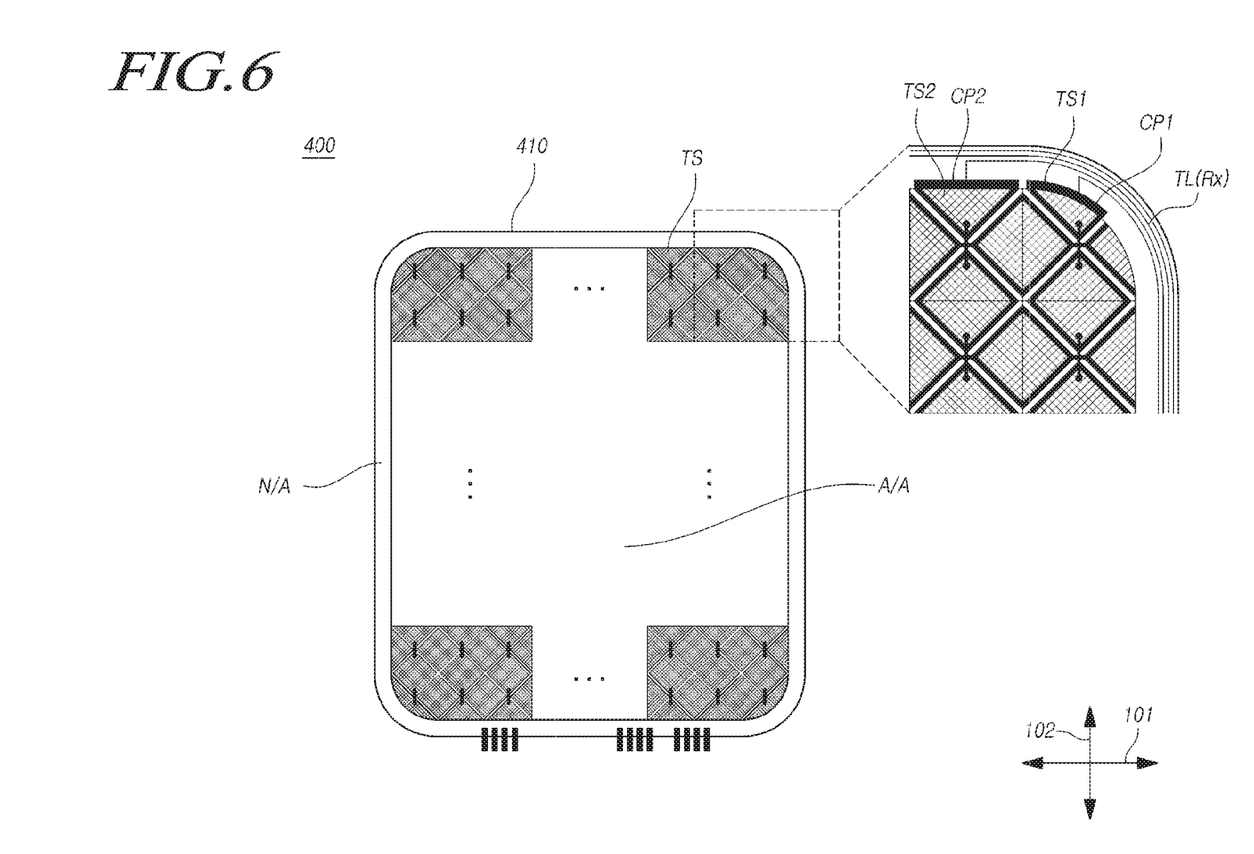
FIG. 6 is a plan view schematically illustrating another example of a structure of a touch display device having one or more curved outer edges, in accordance with one or more embodiments of the present disclosure.

FIG. 6 illustrates another example of a structure of a touch sensor TS disposed at the boundary of the active area A/A in a touch display device 400 according to one or more embodiments of the present disclosure.

Referring to FIG. 6, the touch display device 400 includes a touch display panel 410 on which a plurality of touch sensors TS and a plurality of touch lines TL are disposed and a driving circuit (not illustrated) which drives the touch sensors TS.

An active area A/A in which sub pixels and a touch sensor TS are disposed is disposed inside the touch display panel 410 and a non-active area N/A is disposed outside the active area A/A.

In the active area A/A, a part of the outer edge is a straight line and the other part is a curved line. For example, a curved outer edge may be included in a portion where an outer edge which is a straight line in the first direction 101, e.g., a vertical direction, and an outer edge which is a straight line in the second direction 102, e.g., a horizontal direction, intersect. That is, the outer perimeter of the active area A/A may be curved in corner regions.

The plurality of touch sensors TS disposed in the active area A/A are disposed according to the shape of the active area A/A.

Therefore, when the boundary of the active area A/A is a straight line, the touch sensor TS disposed at the boundary of the active area A/A has a straight line edge and when the boundary of the active area A/A is a curved line, the touch sensor TS has a curved edge.

The plurality of touch sensors TS are connected to touch lines TL which are disposed in the non-active area N/A and a contact pad CP may be disposed between the touch sensors TS and the touch lines TL.

The touch sensor TS and the touch line TL may be connected through the contact pad CP. The contact pad CP may be any element that electrically connects the touch sensors TS to the touch lines TL, and may include any wiring or conductive pathway, such as conductive vias, electrical jumper connections, metallic pads, and the like. When the touch sensor TS is a mesh type, the contact pad CP may be disposed corresponding to an outer edge of the touch sensors TS and the touch lines TL and the touch sensors TS are connected to the touch lines TL via the contact pad CP.

Here, since the touch sensor TS disposed at the boundary of the active area A/A are disposed to have a shape according to the outer edge of the active area A/A, the contact pad CP disposed between the touch sensor TS and the touch line TL may have a shape according to the shape of the touch sensor TS. That is, the contact pad CP may have a curved shape that corresponds to the curved shape of the touch sensor TS at the boundary of the active area A/A.

For example, the first contact pad CP1 which connects the first touch sensor TS1 disposed in a curved boundary of the active layer A/A and the touch line TL may be disposed to have a curved shape according to the shape of the first touch sensor TS1. Further, the second contact pad CP2 which connects the second touch sensor TS2 disposed in a straight line boundary of the active layer A/A and the touch line TL may be disposed to have a straight line shape according to the shape of the second touch sensor TS2.

Since the first contact pad CP1 is disposed to have a curved shape according to the shape of the first touch sensor TS1, an area difference from the second contact pad CP2 connected to the second touch sensor TS2 may be reduced. That is, an area of the first touch sensor TS1 may be effectively increased due to the increased size of the curved first contact pad CP1, thereby reducing the difference in area between the first touch sensor TS1 and the second touch sensor TS2.

Therefore, a difference in resistances of the first contact pad CP1 and the second contact pad CP2 is reduced so that the sensing by the first touch sensor TS1 and the sensing by the second touch sensor TS2 are performed under the same condition, which may suppress influence on the touch sensing due to the different contact pads CP.

In one or more embodiments of the present disclosure, touch display devices are provided in which not only the outer edges of the touch display panel and the active area A/A have various shapes, but also shapes of inner or the outer edges of the touch display panel may be designed in various forms, and the layout structure of the touch sensor TS and the touch line TL by which the touch sensing is allowed is provided.

Figure 7:
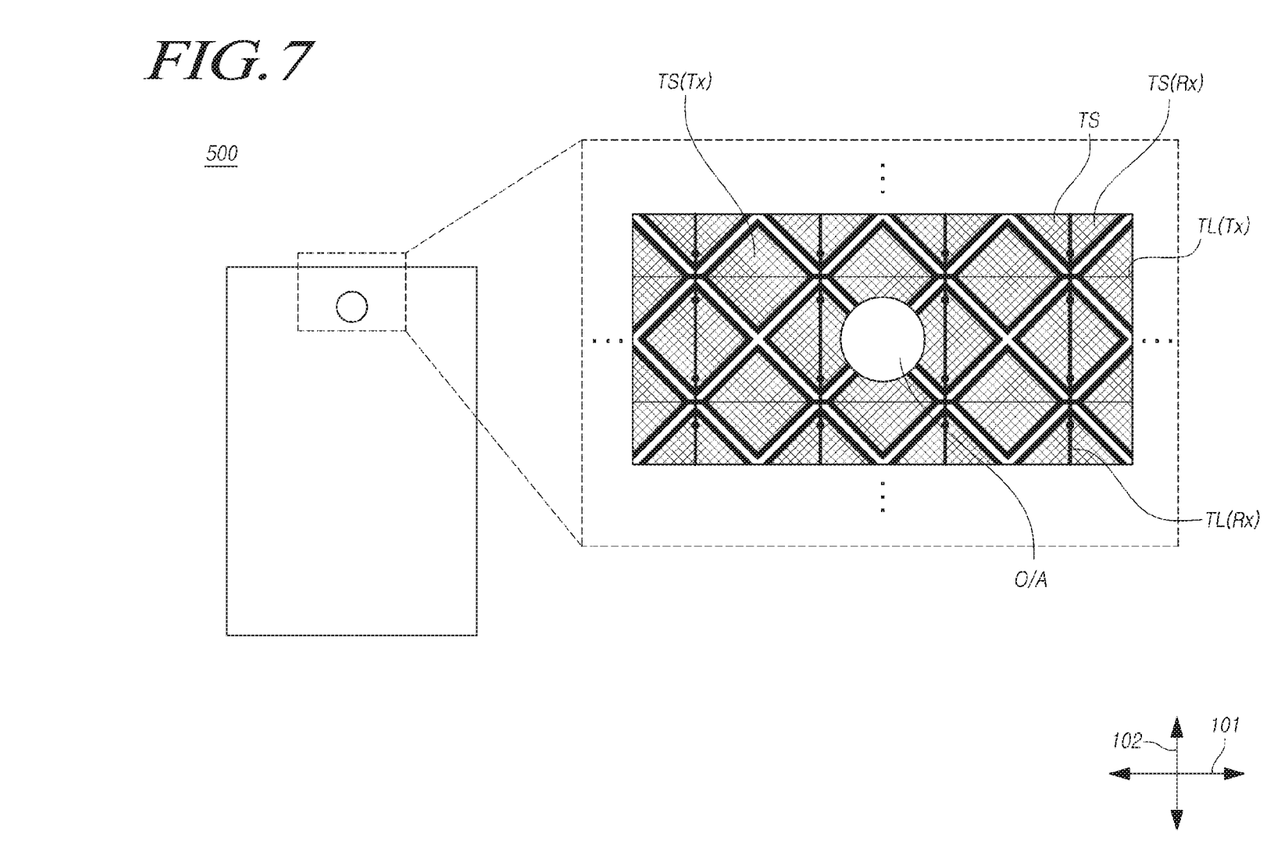
FIG. 7 is a plan view schematically illustrating a structure of a touch sensor and a touch line disposed in a touch display device including an open area, in accordance with one or more embodiments of the present disclosure.
Figure 8:
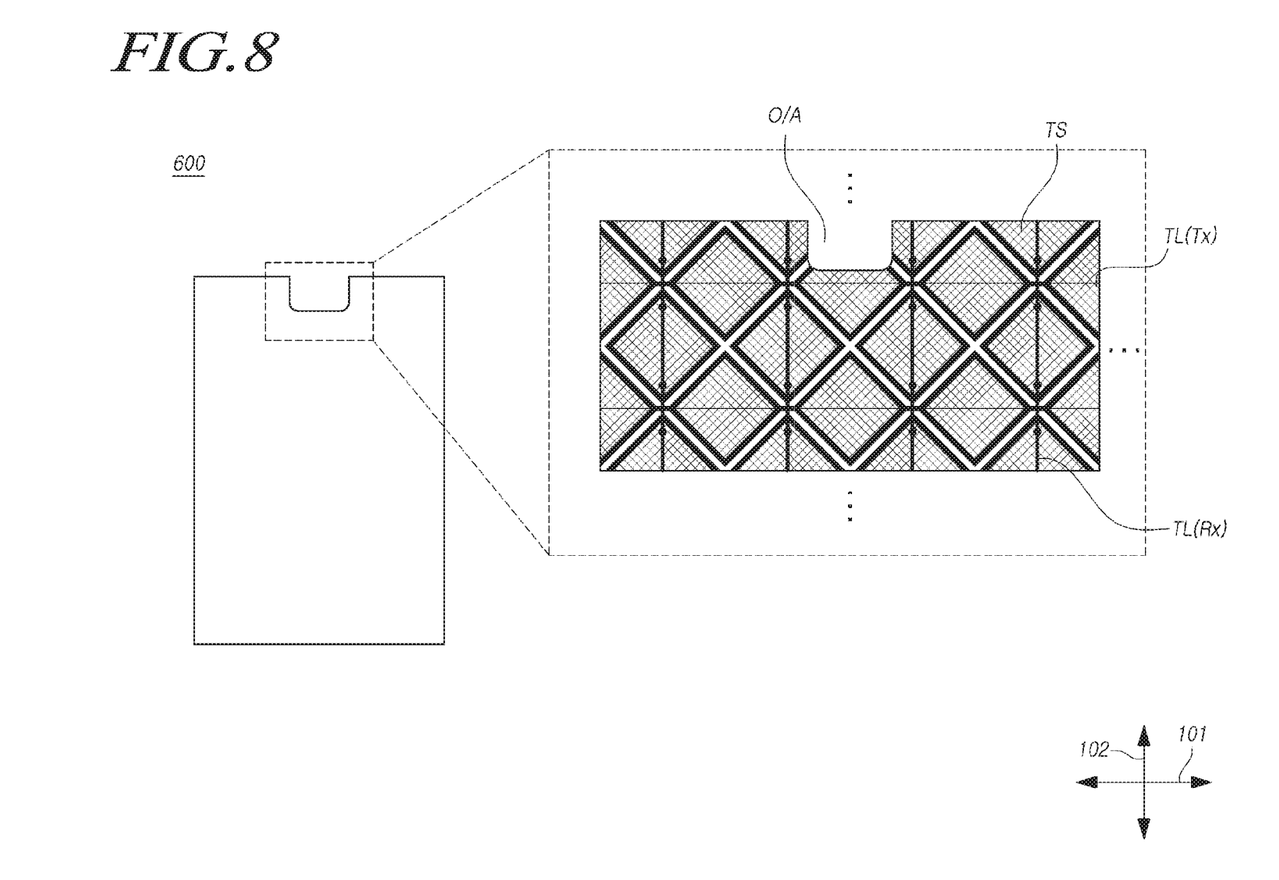
FIG. 8 is a plan view schematically illustrating a structure of a touch sensor and a touch line disposed in a touch display device including a notch formed at an outer edge of the touch display device, in accordance with one or more embodiments of the present disclosure.

FIGS. 7 and 8 illustrate embodiments in which a touch sensor TS and a touch line TL are disposed in a touch display device according to any of the various embodiments provided herein, and illustrate an example of a touch sensing structure when the touch display device includes an open area O/A. The open area O/A may be provided in the display panel and may accommodate various features as desired, for example, a camera module, a button, or the like.

A type of the open area O/A in the touch display device is exemplified as a hole or a notch, but the present embodiments are not limited thereto. The present embodiments may be applied to all cases when an open area O/A is included in an inner portion or along an outer edge of the touch display device.

FIG. 7 illustrates an example in which an open area O/A such as a hole is included inside a touch display panel in a touch display device 500 according to one or more embodiments.

Referring to FIG. 7, the touch display device 500 includes a plurality of touch sensors TS disposed in an active area A/A of the touch display panel.

Tx electrodes of a plurality of touch sensors TS are connected through first touch lines TL(Tx) disposed in the first direction 101, e.g., a horizontal direction, and Rx electrodes are connected through second touch lines TL(Rx) disposed in the second direction 102, e.g., a vertical direction. The first touch lines TL(Tx) may extend across all of the Tx electrodes a respective row (as shown in FIG. 7), or may extend to only a first Tx electrode of a row, which then may be coupled to the other Tx electrodes of the row by first electrical connections 121 (as shown in FIG. 1). Similarly, the second touch lines TL(Rx) may extend across a column of Rx electrodes (as shown in FIG. 7), or may extend only to a first Rx electrode of a column, which may be coupled to the other Rx electrodes of the column by second electrical connections 122 (as shown in FIG. 1).

Here, an open area O/A is included inside the touch display panel and the open area O/A may be disposed between two adjacent touch lines TL.

For example, the open area O/A may be disposed between two adjacent first touch lines TL(Tx) and between two adjacent second touch lines TL(Rx).

Further, the open area may be disposed in a region defined by the intersection of two adjacent first touch lines TL(Tx) and two adjacent second touch lines TL(Rx).

That is, as illustrated in FIG. 7, the open area may be disposed in a quadrangular region defined by the intersection of two adjacent first touch lines TL(Tx) and two adjacent second touch lines TL(Rx).

Therefore, the boundary of the open area O/A formed in the touch display panel may be in contact with four touch sensors TS.

According to the present embodiments, since the open area O/A is disposed between adjacent touch lines TL, the open area O/A may be included without changing the structure of the touch lines TL.

Further, since the touch is sensed by the touch sensors TS adjacent to the open area O/A, even when the touch display device 500 includes an open area O/A such as a hole in the panel, a structure which senses the touch may be provided.

FIG. 8 illustrates another example of a structure of a touch display device 600 according to the second exemplary embodiment and illustrates an example in which a notched open area O/A is included at an outer edge of a touch display panel.

Referring to FIG. 8, the touch display device 600 includes a plurality of touch sensors TS disposed in the active area A/A of the touch display panel. The touch display device 600 includes first touch lines TL(Tx) connected to the plurality of touch sensors TS in the first direction 101, e.g., a horizontal direction, and second touch lines TL(Rx) connected to the touch sensors in the second direction 102, e.g., a vertical direction.

Such a touch display panel may include a notched open area O/A in an outer edge adjacent to an outer edge of the touch display panel.

In this case, the open area O/A formed in the outer edge of the touch display panel may be located between two adjacent second touch lines TL(Rx) disposed in the second direction 102, e.g., the vertical direction as shown in FIG. 8.

Further, the open area may be disposed in a region defined by the intersection of two adjacent second touch lines TL(Rx) and a first touch line TL(Tx) disposed in the first direction 101, e.g., the horizontal direction as shown in FIG. 8.

That is, as the open area O/A which is disposed at the outer edge of the touch display panel and forms a part of the outer edge of the active area A/A is disposed between two adjacent touch lines TL, the open area O/A may be included without changing the design of the touch lines TL.

Further, the touch is sensed by the plurality of touch sensors TS which are in contact with the boundary of the open area O/A so that a structure of the touch sensors TS and the touch lines TL by which the touch sensing is allowed even when the open area O/A is included at the outer edge of the touch display panel may be provided.

According to the present embodiments, the touch sensors TS and the touch lines TL disposed on the touch display panel are disposed to have a shape according to the shape of the touch display panel and the active area A/A, thereby providing a structure in which the touch sensing is allowed in various display devices having various shapes, including, for example, non-quadrangular shapes.

Further, as the shape of the touch sensors TS disposed at the boundary of the active area A/A varies according to the position, a size of the touch sensors TS or a shape of a contact pad CP is adjusted to constantly maintain a sensitivity of touch sensing in every position in the various touch display devices.

Furthermore, the open area O/A is located between two adjacent touch lines TL inside or at an outer edge of the touch display panel, thereby providing a structure in which the touch is sensed in a display device including the open area O/A.

It will be appreciated that various exemplary embodiments of the present disclosure have been described herein for purposes of illustration, and that various modifications, changes, and substitutions may be made by those skilled in the art without departing from the scope and spirit of the present disclosure. Further, the embodiments disclosed herein are intended to not limit but describe the technical spirit of the present disclosure and the scope of the technical spirit of the present disclosure is not restricted by the particular embodiments provided herein. The scope of the present disclosure should be interpreted based on the following appended claims and it should be appreciated that all technical spirits included within a range equivalent thereto are included in the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display device, comprising:
    a display panel having an active area in which a plurality of pixels are disposed, and a non-active area outside of the active area, the active area having an outer perimeter including a curved portion;
    a plurality of touch sensors disposed on the active area; and
    a plurality of touch lines disposed on the non-active area and connected to the plurality of touch sensors, the plurality of touch lines having respective curved portions corresponding to the curved portion of the outer perimeter of the active area,
    wherein the plurality of touch sensors includes first touch sensors positioned adjacent to the curved portion of the outer perimeter of the active area and second touch sensors positioned adjacent to a straight portion of the outer perimeter of the active area, the first touch sensors having a curved outer edge which is disposed to protrude toward the outside of the active area,
    wherein a first one of the first touch sensors is insulated from a second one of the first touch sensors which is adjacent to the first one of the first touch sensors, the first one of the first touch sensors and the second one of the first touch sensors are outmost ones of the plurality of touch sensors, the first one of the first touch sensors and the second one of the first touch sensors are disposed on a same layer not to be overlapped with each other and overlapped the curved portion of the outer perimeter of the active area, and each of the first one of the first touch sensors and the second one of the first touch sensors which are overlapped the curved portion of the outer perimeter of the active area has a curved outer edge which is disposed to protrude toward the outside of the curved portion of the outer perimeter of the active area, and
    wherein at least one of touch lines connected to the second touch sensors has a curved portion corresponding to the curved outer edge of the first touch sensors on the non-active area.

2. The touch display device of claim 1, wherein the first touch sensors are disposed to protrude toward the outside of the active area beyond the second touch sensors which are in contact with the straight portion of the outer perimeter of the active area.

3. The touch display device of claim 1, wherein at least one virtual extended line of an outer edge of the second touch sensors passes through an area that overlaps an area where the first touch sensors are disposed.

4. The touch display device of claim 1, wherein a distance between the curved outer edge of the first touch sensors and the curved portion of the outer perimeter of the active area is greater than a distance between an outer edge of the second touch sensors and the straight portion of the outer perimeter of the active area.

5. The touch display device of claim 1, wherein a curvature of the curved outer edge of the first touch sensors is different from a curvature of an outer edge of the second touch sensors.

6. The touch display device of claim 1, wherein the first touch sensors are fewer in number than the second touch sensors.

7. The touch display device of claim 1, further comprising:
    a plurality of contact pads respectively contacting outer edges of the touch sensors, the touch lines being connected to the touch sensors via the contact pads,
    wherein the contact pads have shapes corresponding to the respective outer edges of the touch sensors, and
    wherein the plurality of touch sensors are mesh type including holes, and the plurality of contact pads do not include holes.

8. The touch display device of claim 7, wherein the plurality of contact pads include first contact pads connected to the first touch sensors and second contact pads connected to the second touch sensors, and the first contact pads have a curved shape according to a shape of the curved outer edge of the first touch sensors.

9. The touch display device of claim 8, wherein the first contact pads are disposed outside of the active area.

10. The touch display device of claim 1, wherein the touch sensors are mesh types including holes which are located to correspond to a light emitting unit of the pixel.

11. The touch display device of claim 10, wherein a portion of the first touch sensors disposed the outside of the active area includes at least one of the holes.

12. The touch display device of claim 10, further comprising color filters overlapping the holes and a black matrix overlapping the touch sensors.

13. The touch display device of claim 1, further comprising an encapsulation layer on the active area and on the non-active area, and the plurality of the touch sensors and the plurality of the touch lines are disposed on the encapsulation layer.

14. The touch display device of claim 13, further comprising a cathode electrode on the active area and the non-active area, the encapsulation layer disposed on the cathode electrode.

15. The touch display device of claim 1, wherein the plurality of touch sensors includes a plurality of Tx electrodes coupled to one another along a first direction and a plurality of Rx electrodes coupled to one another along a second direction, and a touch driving signal is supplied to the Tx electrodes and a touch sensing signal is transmitted from the Rx electrodes.

16. The touch display device of claim 1, wherein at least a part of an area between the first one of the first touch sensors and the second one of the first touch sensors is located outside of the active area.

* * * * *